Feb. 2, 1971 W. KRAUSE ET AL 3,559,374
PROCESS FOR ISOLATING ACETYLENE AND CARBON
DIOXIDE FROM CRACKED GASES
Filed Jan. 21, 1969

INVENTORS
WALTER KRAUSE
HARTMUT SCHILKEN
GUNTER HECK
EGON MALOW

BY Curtis, Morris & Safford
ATTORNEYS

United States Patent Office 3,559,374
Patented Feb. 2, 1971

3,559,374
PROCESS FOR ISOLATING ACETYLENE AND CARBON DIOXIDE FROM CRACKED GASES
Walter Krause, Kelkheim, Taunus, Hartmut Schilken, Frankfurt am Main, and Günter Heck and Egon Malow, Hofheim, Taunus, Germany, assignors to Farbwerke Hoechst Aktiengesellschaft vormals Meister Lucius & Bruning, Frankfurt am Main, Germany, a corporation of Germany
Filed Jan. 21, 1969, Ser. No. 792,612
Claims priority, application Germany, Jan. 30, 1968, P 16 68 086.7
Int. Cl. B01d 53/14
U.S. Cl. 55—31                    10 Claims

ABSTRACT OF THE DISCLOSURE

A process is described for the isolation of carbon dioxide and acetylene from a cracked gas by multistage washings using acetone and dimethylformamide, wherein the cracked gas is first washed with acetone, then acetylene, carbon dioxide and ethylene are expelled from the acetone solution by release from pressure and the acetylene is washed out of this mixture with dimethylformamide.

---

Figure 1:
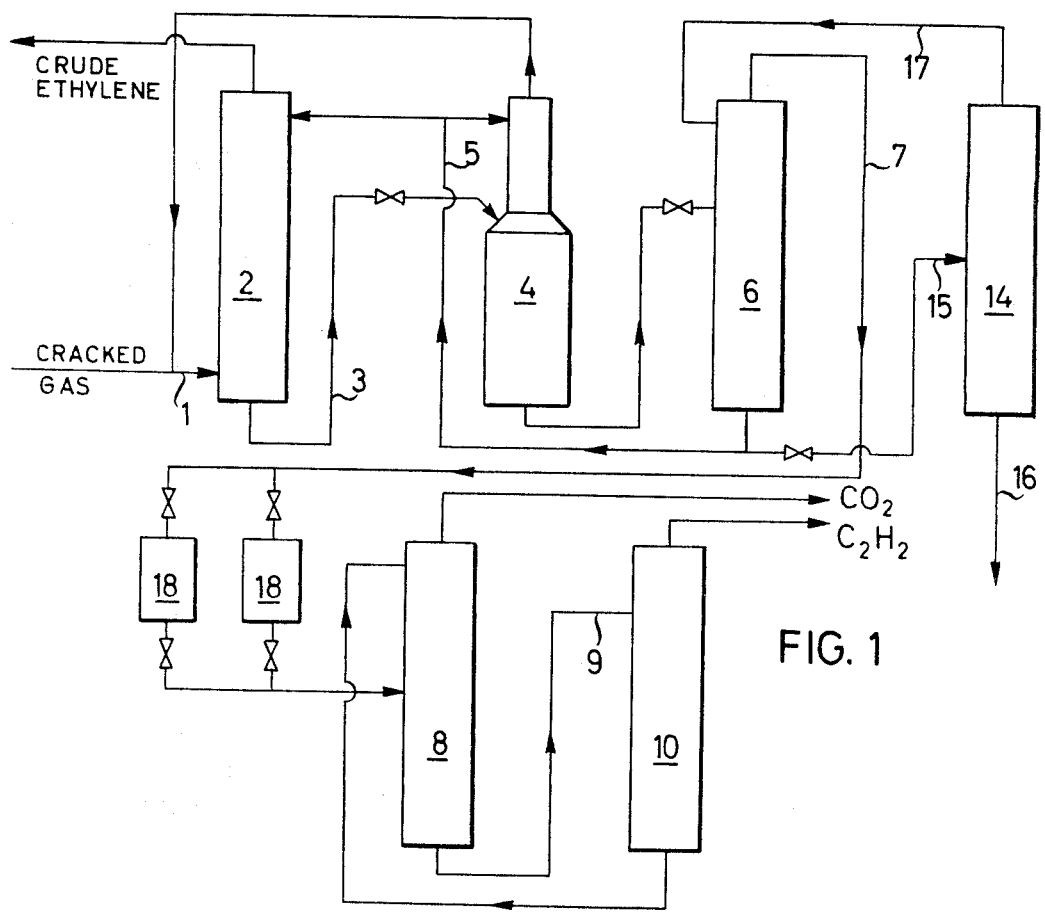

The present invention relates to a process for isolating acetylene and carbon dioxide from cracked gases which have been compressed, predried and prepurified and substantially contain hydrogen, carbon monoxide, ethylene, carbon dioxide, methane and acetylene and optionally small amounts of water and higher hydrocarbons. Such gas mixtures are obtained by the cracking of hydrocarbons. The quantitative composition of the cracked gases depends on the starting material, the type of cracking process and the mode of proceeding.

Various methods for separating gas mixtures have been known. To separate gas mixtures and remove proportions of impurities, washing processes are often used in industry. For these processes washing agents are used which dissolve a component in preference to another in a physical way (designated in the following "physical washing") or bind it chemically (designated in the following "chemical washing"). Contrary to chemical washings, physical washings seldom have a selectivity of over 5:1, that is in addition to the substance which has been dissolved in preference to another and which one intends to isolate or remove, at least one fifth of the rest of the gas mixture is also washed out. The proportion of the different components of the gas mixture absorbed in the solvent depends on the solubility of the components in the washing agent and on the prevailing temperature and pressure. It is known that the absorbing power of the solvent for the gas can be influenced within certain limits by the pressure and the temperature used for the washing; these properties of the solvents are utilized in known manner for the absorption and desorption of gases. Since the solvents do not generally have a very high selectivity, the isolation of a determined substance from a mixture containing many components of similar solubility often poses a real problem which cannot, in most cases, be foreseen or solved in an optimum manner by the known art. To control this problem quite a number of special measures are required, for example multi-stage processes, determined quantitative proportions and conditions of temperature and pressure and special combinations of different washing processes.

It has already been proposed to separate acetylene from gaseous mixtures of hydrocarbons containing small proportions of carbon dioxide by absorption in stages and subsequent desorption, while using solvents such as dimethyl formamide or acetone. In these processes, higher acetylenes, for example diacetylene, and aromatic hydrocarbons are, for example, separated in a first absorption stage; after precompression of the remaining constituents of the gas mixture, carbon dioxide, hydrogen, methane and carbon monoxide, which have not been separated in the first stage, are separated in a following second stage depending on the conditions of temperature and pressure, released from pressure and driven off. In a following third stage the acetylene is completely absorbed by the same solvent.

According to other known processes, carbon dioxide is removed together with sulfur compounds by washing at low temperatures with predominantly polar solvents from a gas mixture which consists chiefly of carbon oxide and hydrogen and which has been obtained by gasification of carbon or by coking. The low temperatures required for this purpose can be obtained with the usual cooling agents only with difficulty, if at all. As polar solvents, methanol or acetone may, for example, be used.

In other known absorption processes for the obtainment of acetylene from cracked gases containing substantial amounts of carbon dioxide (over 2 mol percent), the carbon dioxide has hitherto been removed as far as possible as undesired ballast already in one of the first process stages. This measure which enables the use of wash plants of smaller dimensions entails, however, considerable losses of valuable constituents of the gas mixture, depending on the selectivity of the solvent used. In processes in which undesirable losses can be kept small by using alkaline washes, for example with potash, ammonia or alkazide (chemical washes), undesirable polymerizations and decompositions in the wash solutions caused by the acid cracked gas which also contains higher acetylenes cannot be prevented. A partial loss of the wash solutions, their replacement or a frequent regeneration are unavoidable in such chemical washes.

The present invention provides a process for isolating acetylene and carbon dioxide from a compressed, prepurifid and predried cracked gas which substantially contains hydrogen, carbon monoxide, methane, carbon dioxide, ethylene, acetylene and small amounts of ethane, of higher hydrocarbons and of water, by multistage washings using acetone and dimethyl formamide as solvents which comprises (a) subjecting the cracked gas to an acetone wash at pressures within the range of from 10 to 20 atmospheres absolute and temperatures of the sump within the range of from −10° to −50° C., (b) releasing the acetone solution in the following first fractionating absorption-desorption stage at a temperature of the sump within the range of from −20° to +20° C. to a pressure of 2 to 6 atmospheres absolute, expelling acetylene, carbon dioxide and ethylene, washing the carbon dioxide with acetone out of the desorbed gases until the latter contain only a residual amount of 10 to 20 mol percent thereof and expelling the ethylene also with the acetone until at most 0.2 mol percent, calculated on the amount initially contained in the cracked gas, is left in the gas, (c) releasing the cracked gas in the second desorption stage to a pressure within the range of from 1 to 5.5 atmospheres absolute with supply of heat, liberating the cracked gas from water with acetone in the following absorption stage, and (d) subjecting the substantially anhydrous acetylene, carbon dioxide and ethylene together to a washing with dimethylformamide, the carbon dioxide being withdrawn in the gaseous form at the head of the column together with at most 0.2 mol percent ethylene, and the acetylene which has been absorbed by the dimethylformamide being expelled in known manner in another desorption stage and isolated.

The essential difference between the process of the invention and the known processes lies in the combination of an acetone wash with a dimethylformamide wash to obtain acetylene and carbon dioxide of high purity from a cracked gas containing more than 2.0 mol percent carbon dioxide. The process in accordance with the invention differs furthermore from the known processes in that the carbon dioxide is carried along together with the acetylene and ethylene to the last wash stage and is only then separated from the acetylene. An essential advantage of the process of the invention consists in that, contrary to the known chemical washing process, for example with alkaline wash solutions, polymerization and decomposition within the washing agent are avoided; contrary to the known physical carbon dioxide washes using absorption solutions such as methanol or ethyl acetate, the process of the invention does not require such low absorption temperatures with a comparable selectivity, and uses smaller amounts of solvent with a comparable absorption temperature.

The process in accordance with the invention enables acetylene as well as carbon dioxide to be separated almost without losses in a technically simple manner from cracked gases containing over 20 mol percent carbon dioxide, preferably 10 to 20 mol percent and at least over 2 mol percent carbon dioxide. The acetylene is obtained in a technically pure state, while the carbon dioxide is obtained together with admixtures of ethylene equal to or smaller than 0.2 mol percent. This purity of the carbon dioxide is a prerequisite to its further technical use. By the known alkaline chemical washes carbon dioxide of such a degree of purity could not be obtained.

Another essential advantage of the process of the invention is that owing to the high purity and the almost quantitative yield of the acetylene obtained, it can be combined, without detrimental effect, with a process for the manufacture of ethylene, for example an ethylene low-temperature distillation. By choosing appropriate ranges of pressure and temperature, the process of the invention can be carried out with advantageously small amounts of washing agent, that is acetone and dimethylformamide. For example, the amount of wash solution required by the known potash washing process for the removal of carbon dioxide is five to ten times the amount required in accordance with the invention. The process in accordance with the invention therefore enables the use of apparatus of smaller dimensions and a rather low consumption of energy.

The arrangement of the individual wash stages in accordance with the invention enables the small amounts of undesirable impurities contained in the cracked gas, for example, water and higher hydrocarbons to be removed in a simple manner from the stream of crude gas with the help of the acetone. The subsequent removal of these impurities can be carried out by a simple rectification of the acetone. Owing to the low boiling point of the acetone the latter can be obtained in a pure form as head product; the impurities accumulating in the course of a prolonged time of working remain in the sump. The low boiling point of the acetone also enables hot water to be used as heating medium and thus to economize costs of energy.

Thanks to the acetone wash carried out before the dimethylformamide wash, the cracked gas entering the latter is free from traces of water and higher hydrocarbons. In this manner the danger of the dimethylformamide being contaminated is avoided and a following purification is superfluous. A purification of the dimethylformamide by distillation would be very complicated since higher hydrocarbons might lie in the boiling range of the dimethylformamide and the higher boiling point of dimethylformamide (about 153° C.) would require the use of hot steam of about 180° C. Furthermore, traces of water would already lead to a hydrolysis of the dimethylformamide to formic acid, which would cause annoying corrosion problems.

Figure 2:
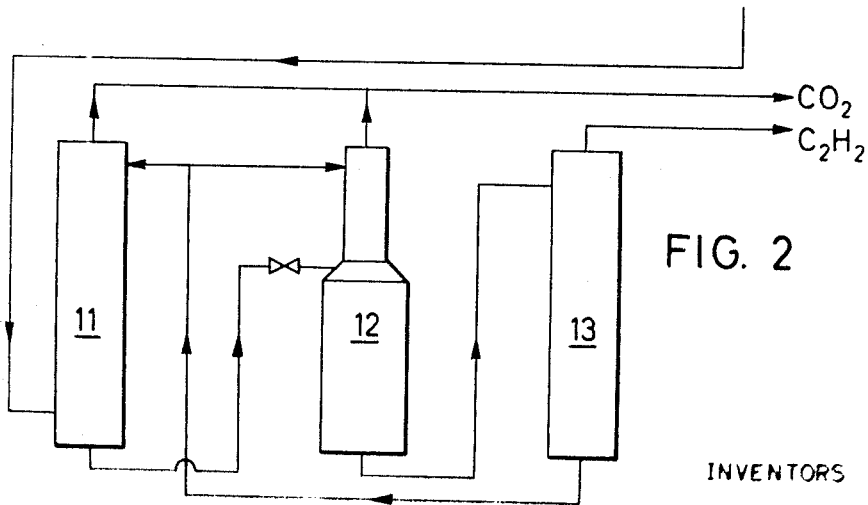

A method of carrying out the process of the invention is illustrated diagrammatically by way of example in FIGS. 1 and 2 of the accompanying drawing. Pumps, heat exchangers and regeneration plants as well as apparatus for removing solvent residues from the gas streams are shown only partially for the sake of simplification. FIG. 1 shows diagrammatically the process of the invention for the isolation of acetylene and carbon dioxide from cracked gases, comprising a combination of an acetone wash with a dimethylformamide wash, while FIG. 2 shows a preferred form of the dimethylformamide wash. The following example serves to illustrate the invention, but is not intended to limit it.

EXAMPLE

In FIG. 1 of the accompanying drawing, 3314K mol/h. of a cracked gas which had been washed with a petroleum fraction having a final boiling point of about 160° or 220° C., for example gasoline, freed from higher acetylenes such as diacetylene, hydrocarbons having 3 or 4 carbon atoms and higher hydrocarbons, and predried, were introduced at a temperature within the range of from $-10°$ to $-50°$ C. and a pressure within the range of from 10 to 20 atmospheres absolute together with the gas returned from the absorber 4 into the washing column 2 at 1 and flowed in counter-current to 2000K mol/h. of regenerated acetone. The amount of acetone varied within a limit of 1000 to 3000K mol/h. In the sump of column 2 a temperature of $-10°$ to $-50°$ C., preferably $-20°$ to $-45°$ C., and at the head of the column 2 a temperature of $-25°$ to $-60°$ C. was maintained with the help of intercoolers. The acetone leaving at 3 contained the total amount of the acetylene and carbon dioxide contained in the cracked gas, relatively large amounts of ethylene and small amounts of ethane, methane and traces of water and of higher hydrocarbons. At the head of the column 2 the rest of the constituents of the cracked gas, such as hydrogen, carbon monoxide, methane, ethylene, traces of water and heavy hydrocarbons left as crude ethylene at the head of the column 2. The acetone charged in column 2 with acetylene, carbon dioxide and small amounts of ethylene, ethane and methane was introduced into a desorber-absorber 4 while being released to a pressure of 2 to 6 atmospheres absolute, preferably 4 to 5 atmospheres absolute, the sump of the desorber-absorber 4 being maintained at a temperature of $-20°$ to $+20°$ C., advantageously 0° to 15 C., and the fractionating detachment thereof being maintained at $-20°$ to $-60°$ C. with the help of additional intercoolers. The gas mixture expelled in column 4 under the prevailing pressure and temperature flowed in counter-current to 600K mol/h. of regenerated acetone from conduit 5; the remaining constituents of the gas, with the exception of the carbon dioxide and acetylene which had partially been absorbed anew in dependence on the temperature, the pressure and the amount of acetone used (500 to 1000K mol/h.), were returned to column 2.

In the following desorber 6, the acetone drawn off from the sump of the rectifying absorber 4 was released to a pressure of 1 to 5.5 atmospheres absolute, preferably 4.5 to 5.5 atmospheres absolute, at temperatures within the range of from 56° to 120° C., advantageously 105° to 115° C., and gave off its absorbed gas mixture which consisted chiefly of carbon dioxide, acetylene and small amounts of ethylene (equal to or smaller than 0.2 mol percent). The gas mixture was introduced through the conduit 7 into the dimethylformamide wash 8. In the column 8, the acetylene was washed out under a pressure of 1.6 to 2.0 atmospheres absolute with 1000K mol/h. of dimethylformamide while cooling and the carbon dioxide was obtained together with ethylene at the head of the column at temperatures of $-15°$ to $-25°$ C. For the washing out or the absorption of the acetylene 500 to 1000K mol/h. of dimethylformamide were used.

The dimethylformamide charged with acetylene was conveyed from the sump of column 8 through conduit 9 into the column 10 where the dimethylformamide was separated from the acetylene at a sump temperature of 150° to 170° C. and returned to the dimethylformamide wash in column 8.

The water and higher hydrocarbons contained as impurities in the sump product of the column 6 (desorber) were removed from the acetone in the rectifying column 14 and separated. For this purpose, a small partial stream 15 of the circulating acetone was drawn off continuously and introduced into the column 14. In said column 14 pure acetone was separated as head product (stream 17) under a pressure of about 1 atmosphere absolute and the impurities, that is water and higher hydrocarbons, were separated as sump product (stream 16). By a simple regulation of the stream 15, the amount of impurities (sump products: water, higher hydrocarbons) could be adjusted as desired. To dry as far as possible the gas stream (acetylene, carbon dioxide, ethylene) flowing to the dimethylformamide wash 8, the anhydrous acetone (stream 17) was conducted in counter-current to that gas stream in the desorber 6. Any traces of water which might still be present in the gas mixture consisting of carbon dioxide, acetylene and ethylene were removed in towers 18 charged with the usual absorption agents, for example, silica gel, activated carbon or molecular sieves.

Alternatively, the dimethylformamide wash may be carried out according to the process shown diagrammatically in FIG. 2 of the accompanying drawing. For the absorption of the acetylene, 1500 to 2500K mol/h. dimethylformamide were introduced into column 11 and 500 to 2000K mol/h. dimethylformamide into column 12. The carbon dioxide was obtained at the heads of absorber 11 and rectifying absorber 12, while the acetylene separated from the dimethylformamide was obtained as head product of desorber 13. The column 11 was maintained under a pressure of about 3 to 6 atmospheres absolute, the column 12 under a pressure of about 1.6 to 2.0 atmospheres absolute and the desorber 13 under a pressure of about 1 to 1.5 atmospheres absolute. For this form of the dimethylformamide wash, higher temperatures could be used in columns 11 and 12 than for the corresponding wash in column 8 of the scheme shown in FIG. 1.

The following table illustrates by way of example the process of the invention according to FIG. 1, while indicating the composition of the gas mixture and the throughputs of gas and washing agent in K mol/h. for the individual washing and desorption stages. The by-products which were obtained in traces and the impurities have not been considered in the table.

TABLE

| | Acetone wash, K mol/h. | | | | | | | | | Dimethylformamide wash, K mol/h. | | | | |
|---|---|---|---|---|---|---|---|---|---|---|---|---|---|---|
| | Main wash (column 2) | | | | 1st stage of release (column 4) | | | 2nd stage of release (column 6) | | 1st stage (column 8) | | | 2nd stage (column 10) | |
| | Introduction | | Head product crude ethylene | Sump product | Introduction | Head product | Sump product | Head product | Sump product | Introduction | Head product | Sump product | Head product | Sump product |
| | Cracked gas | Return gas | | | | | | | | | | | | |
| $H_2$ | 1,000 | | 1,000 | | | | | | | | | | | |
| $CO$ | 550 | | 550 | | | | | | | | | | | |
| $N_2$–A–$O_2$ | 40 | | 40 | | | | | | | | | | | |
| $CO_2$ | 460 | 100 | | 560 | 560 | 100 | 460 | 460 | | 460 | 460 | | | |
| $CH_4$ | 410 | 16 | 410 | 16 | 16 | 16 | | | | | | | | |
| $C_2H_2$ | 300 | | | 300 | 300 | | 300 | 300 | | 300 | | | 300 | |
| $C_2H_4$ | 540 | 300 | 540 | 300 | 300 | 300 | 1 | 1 | | 1 | 1 | | | |
| $C_2H_6$ | 14 | 5 | 14 | 5 | 5 | 5 | | | | | | | | |
| Acetone | 2,000 | 2 | 2 | 1,998 | 1,998 | 2.1 | 2,598 | 2 | 2,600 | | | | | |
| DMF | | | | | | | | | | 1,000 | | 1,000 | | 1,000 |

What is claimed is:

1. A process for isolating carbon dioxide and acetylene from a compressed, prepurified and predried cracked gas containing substantially hydrogen, carbon monoxide, methane, carbon dioxide, ethylene, acetylene and small amounts of ethane, of heavy hydrocarbons and of water, by multistage washings using acetone and dimethylformamide as solvents, which comprises:

(a) subjecting the cracked gas to an acetone wash at pressures within the range of from 10 to 20 atmospheres absolute and temperatures of the sump within the range of from $-10°$ to $-50°$ C., (b) releasing the acetone solution in the following first fractionating absorption-desorption stage at a temperature of the sump within the range of from $-20°$ to $+20°$ C. to a pressure of 2 to 6 atmospheres, absolute, expelling acetylene, carbon dioxide and ethylene, washing the carbon dioxide with acetone out of the desorbed gases until the latter contain only a residual amount of 10 to 20 mol percent thereof and expelling the ethylene also with the acetone until at most 0.2 mol percent, calculated on the amount initially contained in the cracked gas, is left in the gas, (c) releasing the cracked gas in the second desorption stage to a pressure within the range of from 1 to 5.5 atmospheres absolute with supply of heat, liberating the cracked gas from water with acetone in the following absorption stage, and (d) subjecting the substantially anhydrous acetylene, carbon dioxide and ethylene together to a washing with dimethylformamide, the carbon dioxide being withdrawn in the gaseous form at the head of the column together with at most 0.2 mol percent ethylene, and the acetylene which has been absorbed by the dimethylformamide being expelled in known manner in another desorption stage and isolated.

2. The process of claim 1 wherein the cracked gas used contains 10 to 20 mol percent carbon dioxide.

3. The process of claim 1 wherein 1000 to 3000K mol/h. acetone are used for the acetone wash.

4. The process of claim 1 wherein the temperature of the sump of the column in the acetone wash is within the range of from $-20°$ to $-45°$ C.

5. The process of claim 1 wherein the head temperature of the column in the acetone wash is within the range from $-25°$ to $-60°$ C.

6. The process of claim 1 wherein the sump temperature in the first absorption-desorption stage is within the range of from 0° to 15° C. and the pressure is within the range of from 4 to 5 atmospheres absolute.

7. The process of claim 1 wherein the acetone solution is released to a pressure of 4.5 to 5.5 atmospheres absolute in the second desorption stage.

8. The process of claim 1 wherein the acetone solution is heated in the second desorption stage to a temperature within the range of from 56° to 120° C.

9. The process of claim 1 wherein the acetone solution is heated in the second desorption stage to a temperature within the range of from 105° to 115° C.

10. The process of claim 1 wherein 500 to 1000K mol/h. dimethylformamide are used for the dimethylformamide wash.

References Cited

UNITED STATES PATENTS

| | | | |
|---|---|---|---|
| 3,087,310 | 4/1963 | Rottmayr | 55—64X |
| 3,279,152 | 10/1966 | Rottmayr | 55—64X |

SAMIH N. ZAHARNA, Primary Examiner

R. W. BURKS, Assistant Examiner

U.S. Cl. X.R.

55—64